(No Model.)

C. A. RITTENHOUSE.
BUTTER FIRKIN.

No. 460,033. Patented Sept. 22, 1891.

WITNESSES:
A. J. Schwartz
C. S. Frye

C. A. Rittenhouse,
INVENTOR

BY
W. T. FitzGerald & Co.,
ATTORNEYS.

UNITED STATES PATENT OFFICE.

CHARLES A. RITTENHOUSE, OF BIG RUN, PENNSYLVANIA.

BUTTER-FIRKIN.

SPECIFICATION forming part of Letters Patent No. 460,033, dated September 22, 1891.

Application filed April 28, 1891. Serial No. 390,830. (No model.)

*To all whom it may concern:*

Be it known that I, CHARLES A. RITTENHOUSE, a citizen of the United States, residing at Big Run, in the county of Jefferson and State of Pennsylvania, have invented certain new and useful Improvements in Butter-Firkins; and I do hereby declare the following to be a full, clear, and exact description of the invention, such as will enable others skilled in the art to which it appertains to make and use the same.

My invention consists of a new and improved butter-firkin, which will preserve the butter stored within it in perfect condition for a great length of time, and the invention will be hereinafter fully described and claimed.

Figure 1:
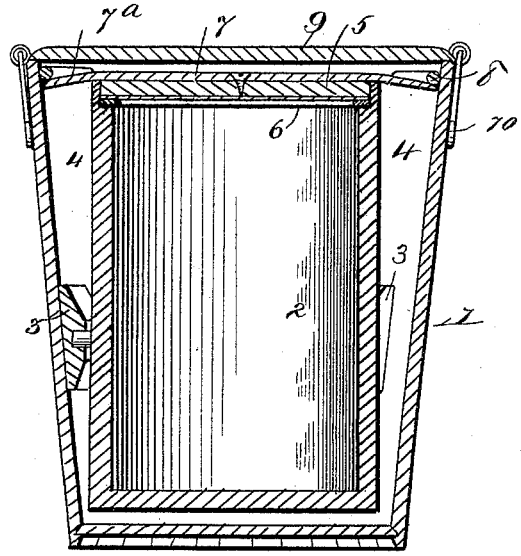
Figure 2:
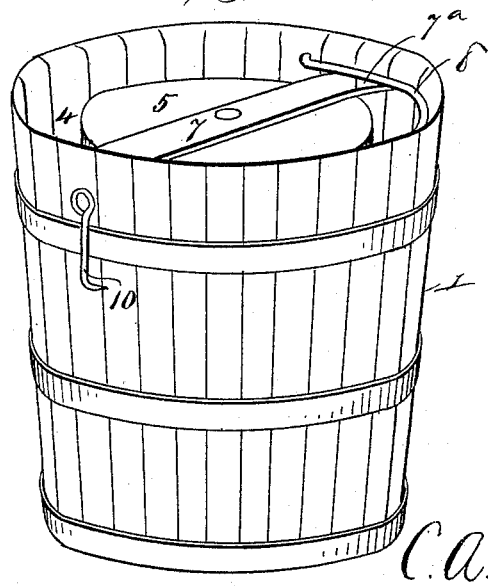

Referring to the accompanying drawings, Figure 1 is a central vertical sectional view of the firkin. Fig. 2 is a perspective view of the same with the top of the outer vessel removed.

The same numerals of reference indicate corresponding parts in both figures.

Referring to the several parts by their designating numerals, 1 indicates the outer vessel, which is preferably formed of wood, the general shape of which resembles that of an ordinary water-bucket; but this outer vessel may be made in different shapes as long as it effects the same result.

2 indicates a smaller pail or vessel, which I prefer to construct of granite or agate iron, so that it will preserve the butter, and the ingredients will not have any effect on the vessel itself. The inner vessel 2, which is considerably smaller than the outer receptacle 1, is held in position in the center of the same by means of three cleats or spacing-blocks 3, which are secured, as shown, to the inner side of the outer receptacle 1. By this construction when the inner vessel 2 is placed in position an annular chamber or space 4 will be left between the inner and outer vessels, and this space is filled with ice or water or with ice and salt.

The top of the inner vessel 2 is closed by the cover 5, which is preferably made of wood, and is lined with zinc, which will not corrode by coming in contact with salt or water, and a packing-ring 6, of rubber or other suitable material is secured around the edge of the inner side of the cover, so that when the cover is fitted down in the shouldered upper end of the butter-receptacle 2 it will make the said receptacle perfectly air-tight. The cover is locked and held in position by means of a flat spring-bar 7, which is placed on the top of the cover, as shown, the ends 7ª of this straight spring-bar being caught under catches or projections 8, which are secured to the inner side of the outer vessel 1 at the opposite points shown.

When the spring-bar is placed on the top of the cover 5 and its ends are sprung or caught under the catches 8, the cover will be firmly pressed on the shouldered top of the butter-receptacle 2, and will be locked and held in position until the spring-bar is removed. The butter-receptacle having been thus closed, the space surrounding the same is filled with ice or water or ice and salt. The top of the firkin is closed by the cover 9, which may be secured in any desired manner, and which I have here shown held by the usual pivoted hooks 10.

It will be seen that the ice or similar substance contained in the chamber between the metal butter-receptacle 2 and the wooden outer vessel will effectually extract the heat from the butter and preserve it for an indefinite period in a cool, pure, and sweet condition.

Having thus described my invention, what I claim, and desire to secure by Letters Patent, is—

In a butter-firkin, the combination of the outer vessel 1, having a suitable cover and provided with the spacing-blocks 3 and the opposite catches 8, the metallic butter-receptacle 2, having the shouldered upper end, the wooden cover 5, having the zinc lining and the rubber packing-ring, and the straight spring-locking bar 7, adapted to fit on the top of the cover 5 and having its ends adapted to engage beneath the opposite catches 8, substantially as set forth.

In testimony whereof I affix my signature in presence of two witnesses.

CHARLES A. RITTENHOUSE.

Witnesses:
 CHESTER PROUTY,
 LUTHER RITTENHOUSE.